(12) United States Patent
Lee et al.

(10) Patent No.: US 7,561,224 B2
(45) Date of Patent: Jul. 14, 2009

(54) BACKLIGHT MODULE OF FLAT PANEL DISPLAY

(75) Inventors: Nan-Ching Lee, Kaohsiung (TW); Chung-Kuang Tsai, Jhudong Township, Hsinchu County (TW); Kuang-Ting Cheng, Tainan (TW)

(73) Assignee: AU Optronics Corporation, Hsinchu (TW)

( * ) Notice: Subject to any disclaimer, the term of this patent is extended or adjusted under 35 U.S.C. 154(b) by 405 days.

(21) Appl. No.: 11/476,504

(22) Filed: Jun. 28, 2006

(65) Prior Publication Data
US 2007/0147022 A1    Jun. 28, 2007

(30) Foreign Application Priority Data
Dec. 26, 2005    (TW) .............................. 94146552 A

(51) Int. Cl.
G02F 1/1333 (2006.01)
G09F 13/04 (2006.01)

(52) U.S. Cl. .............................. 349/58; 349/56; 349/60; 362/97

(58) Field of Classification Search .................... 349/56, 349/58, 60; 362/97
See application file for complete search history.

(56) References Cited

U.S. PATENT DOCUMENTS 5,666,261 A    9/1997    Aguillera
6,880,947 B2    4/2005    Hsieh et al.
6,976,781 B2 *    12/2005    Chu et al. .................... 362/633

FOREIGN PATENT DOCUMENTS

| CN | 1444071 | 9/2003 |
|---|---|---|
| CN | 1567059 | 1/2005 |
| JP | 2004-134265 | 4/2004 |
| TW | 07-083260 | 3/1995 |
| TW | 594272 | 3/1995 |

OTHER PUBLICATIONS

English language translation of abstract of CN 1444071.
English language translation of abstract of JP 2004-134265.
English language translation of abstract of CN 1567059.

* cited by examiner

*Primary Examiner*—Kevin S Wood
(74) *Attorney, Agent, or Firm*—Thomas, Kayden, Horstemeyer & Risley

(57) ABSTRACT

A backlight module of a flat panel display for lighting the flat panel display is described. The backlight module includes a rear bezel, a plurality of lamps, an optical film and a middle bezel. The rear bezel is composed of a bezel main body and sidewalls. The bezel main body includes a plurality of ribs to enhance the strength thereof and a plurality of studs to fix with a wall mounting bracket or a foot stand. The middle bezel fixes the optical film on the rear bezel. The backlight module may further include a plurality of supports integrated the rear bezel. A reflective film may also be integrated on the rear bezel to further reduce the quantity of separable components of the flat panel display.

9 Claims, 4 Drawing Sheets

BACKLIGHT MODULE OF FLAT PANEL DISPLAY

RELATED APPLICATIONS

The present application is based on, and claims priority from, Taiwan Application Serial Number 94146552, filed on Dec. 26, 2005, the disclosure of which is hereby incorporated by reference herein in its entirety.

FIELD OF THE INVENTION

The present invention generally relates to a backlight module of a flat panel display. More particularly, this invention relates to a bezel of a backlight module for a large size liquid crystal display.

BACKGROUND OF THE INVENTION

Rapid development in information technology has raised consumer expectations and the demand for electronic devices with superior audio and video quality. The large volume of conventional cathode ray tube (CRT) displays makes them unsuitable for use in multimedia applications. Therefore, many flat panel displays such as liquid crystal display (LCD), plasma display panel (PDP), and field emission display (FED) have been recently developed. LCD displays are thin, light, short and small monitors, and they are thus becoming the mainstream display apparatus.

Rapid progress in both optical technology and semiconductor technology has enabled liquid crystal displays (LCD) to be applied in a diverse range of electrical products. Moreover, with the advantages of high image quality, compact size, light weight, low driving voltage, and low power consumption, LCDs have been introduced into portable computers, personal digital assistants, color televisions, and are gradually replacing cathode ray tubes (CRT) used in conventional displays.

Furthermore, the market share, and size of large size LCDs have both increased and currently some of the large size LCDs are bigger than conventional PDP displays. Mainstream LCDs use a backlight type of liquid crystal display comprising a liquid crystal panel in the front portion and a backlight module in the rear portion. Therefore, large size LCDs need a large enough backlight module to light up the liquid crystal panel.

LCDs normally utilize cold cathode fluorescent lamps in the backlight module and optical films to uniformly distribute the light to the liquid crystal layer of the liquid crystal panel. The cold cathode fluorescent lamps, the optical films, and even the liquid crystal panel are fixed on a rear bezel, and the rear bezel is further fixed to a wall mounting bracket or a foot stand to allow the LCD can be hung on a wall or stand alone.

Large size liquid crystal displays are increasingly large and the strength of the rear bezel must necessarily be increasingly strong. The weight and tooling cost of a conventional metal rear bezel are therefore also increasing.

SUMMARY OF THE INVENTION

It is an objective of the present invention to provide a rear bezel for a flat panel display for effectively reducing the total weight of the rear bezel and offering enough strength to support the components of the flat panel display.

It is another objective of the present invention to provide a rear bezel for a flat panel display which is integrated with the reflective films behind the lamps to effectively reduce the total manufacturing cost of the liquid crystal display.

It is yet another objective of the present invention to provide a rear bezel for a flat panel display which is integrated with the reflective films and the lamp fixers to further reduce the total manufacturing cost of the liquid crystal display.

It is still another objective of the present invention to provide a rear bezel for a flat panel display that utilizes ribs and sidewalls to enhance the total strength of the rear bezel and further utilize supporting studs to attach the rear bezel with a wall mounting bracket and/or a foot stand.

To accomplish the above objectives, the present invention provides a backlight module for a flat panel display. The backlight module includes a first bezel, such as a rear bezel, a plurality of lamps, an optical film, and a second bezel, such as a middle bezel. The first bezel is composed of a bezel main body and a sidewall structure. One side of the bezel main body includes a plurality of ribs interlaced thereon to reinforce the strength of the first bezel and a plurality of studs to couple to a foot stand and/or a wall mounting bracket.

A plurality of lamps are disposed on the other side of the first bezel and at least one optical film is disposed on the lamps. A second bezel is further disposed on the optical film to clamp the optical film with the first bezel.

The backlight module further includes a plurality of lamp supports integrated on the bezel main body to support the foregoing lamps. The backlight module further includes a reflective film integrated on the bezel main body to effectively reflect the light generated by the lamps. The bezel main body is preferably made of a material with high reflection coefficient, or a material with a high reflection coefficient is coated on the bezel main body.

The first bezel can further include at least one positioning protrusion integrated on the sidewall of the first bezel to couple to at least one positioning opening of the optical film so as to secure the optical film on the first bezel. The supporting stud is preferably a round stud or a polygonal stud. The ribs constitute a plurality of reinforced lattices, for example, square reinforced lattices or polygonal reinforced lattices such as honeycomb reinforced lattices.

Another aspect of the present invention is to provide a flat panel display including the foregoing backlight module to simplify the assembling process for the flat panel display and further reduce the weight and cost of the flat panel display. In addition, a printed circuit board can be disposed on a space between the surface of the bezel main body and the stud protruding from the surface of the bezel main body. The circuit board can be shaded by a metal film or box to prevent from electromagnetic waves.

Still another aspect of the present invention is to provide a first bezel of a flat panel display to integrate the reflection film, a plurality of ribs, a plurality of sidewalls and a plurality of studs to reduce the number of components on the flat panel display and make it easier to assemble the flat panel display.

Hence, the backlight module of the flat panel display according to the present invention utilizes an integrated first bezel to reduce the total weight of the flat panel display and further utilizes the ribs and sidewalls to reinforce the strength of the first bezel to effectively support the flat panel display components. The flat panel can further integrate supporting studs directly on the first bezel to conveniently be connected to the foot stand and/or the wall mounting bracket. In addition, the reflective film and the lamp supporters can also be integrated on the first bezel to simplify the assembling processes of the flat panel display.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is currently the best implementation of the present invention. This description is not to be taken in a limiting sense but is made merely to describe the general principles of the invention. The scope of the invention should be determined by referencing the appended claims.

Figure 1:
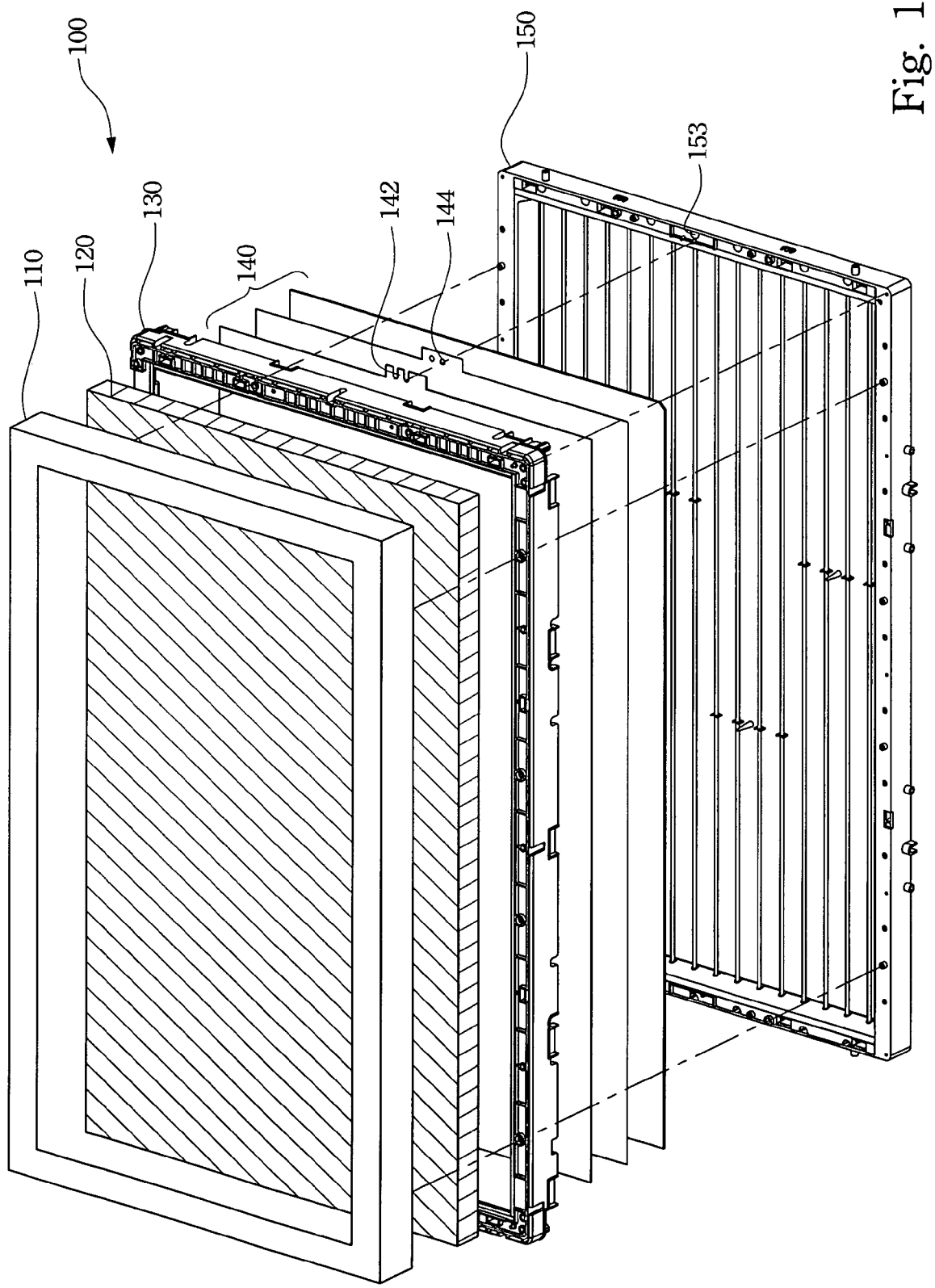
FIG. 1 illustrates an exploded view of a preferred embodiment of the flat panel display according to the present invention.

FIG. 1 illustrates an exploded view of a preferred embodiment of the flat panel display according to the present invention. The flat panel display 100 is composed of a third bezel 110, such as a front bezel, a display panel 120, a second bezel 130, such as a middle bezel, at least one optical film 140, and a first bezel module 150, such as a rear bezel module. The optical film 140 is, for example, a diffusion film, a brightness enhancement film and/or a combination thereof. The second bezel 130, the optical film 140, and the first bezel module 150 together constitute a backlight module of the flat panel display 100 to create a light source for the display panel 120.

Figure 2:
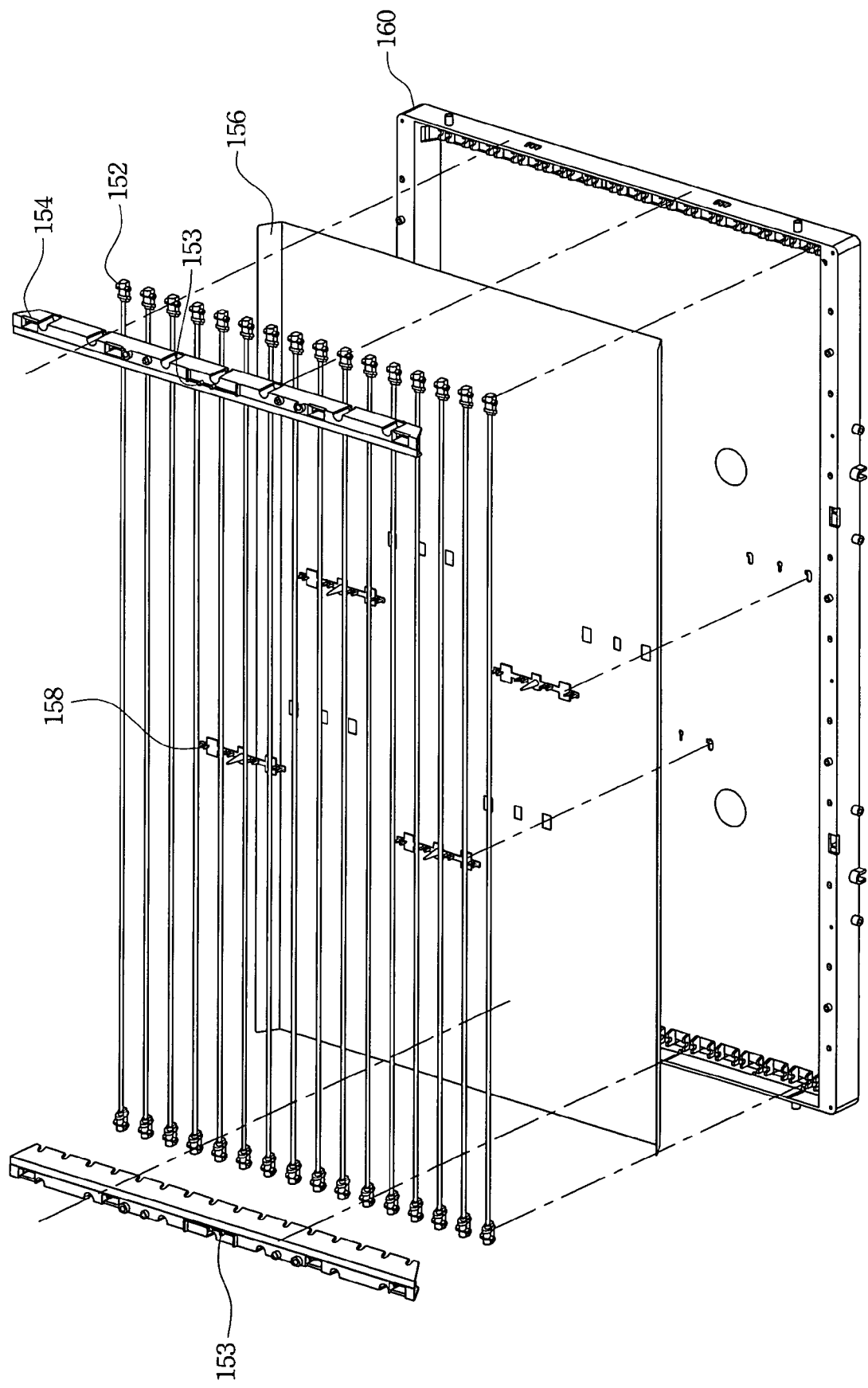
FIG. 2 is a partially exploded view of a backlight module of the preferred embodiment of FIG. 1.

Referring to FIG. 2 simultaneously, FIG. 2 illustrates a partially exploded view of a backlight module of the preferred embodiment of FIG. 1. The first bezel module 150 further includes a first bezel 160, such as a rear bezel, at least one reflective film 156 disposed on the first bezel 160, lamp supports 158, cold cathode fluorescent lamps 152, and lamp fixers 154. The reflective film 156 maximizes the brightness of the light generated by the cold cathode fluorescent lamps 152 on the front panel display 120 by effectively reflecting the light towards the direction of the display panel 120 and by preventing any light from escaping through the first bezel 160. The reflected film 156 is secured on the first bezel 160 with lamp fixers 154. The lamp supports 158 safely support the slim cold cathode fluorescent lamps 152 to prevent the cold cathode fluorescent lamps 152 from being damaged during transportation and/or assembly.

In addition, for uniformly distributing the light on the display panel 120, the optical film 140 is used in the backlight module and fixed between the second bezel 130 and the first bezel 160, which is coupled with the second bezel 130. The optical film 140 further includes positioning indentations 142 and/or positioning holes 144 thereon to couple to the positioning protrusions 153 on the lamp fixers 154 to conveniently position the optical film 140 on the first bezel 160.

Figure 3:
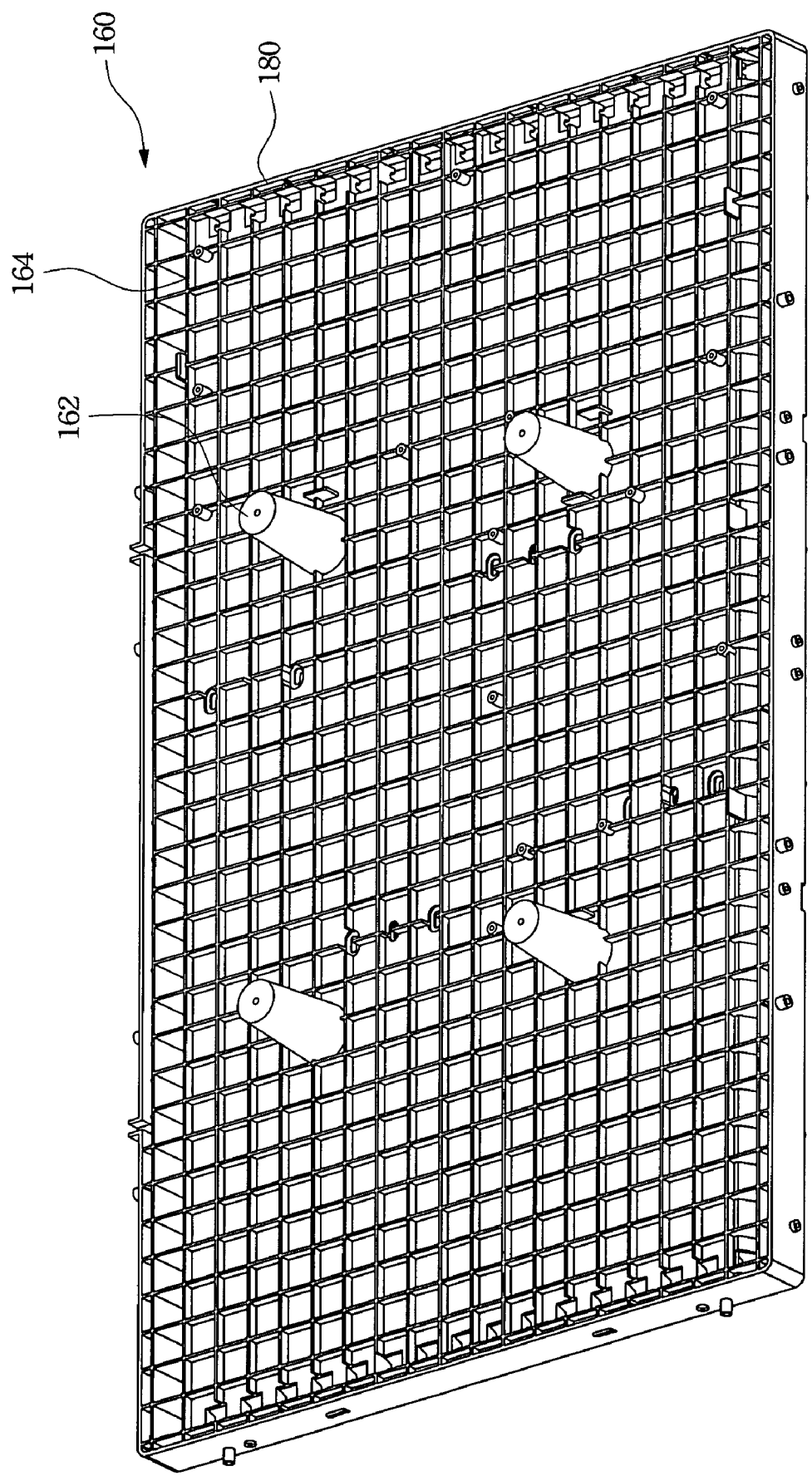
FIG. 3 is a preferred embodiment of a real bezel of a backlight module of the flat panel display according to the present invention.
Figure 4:
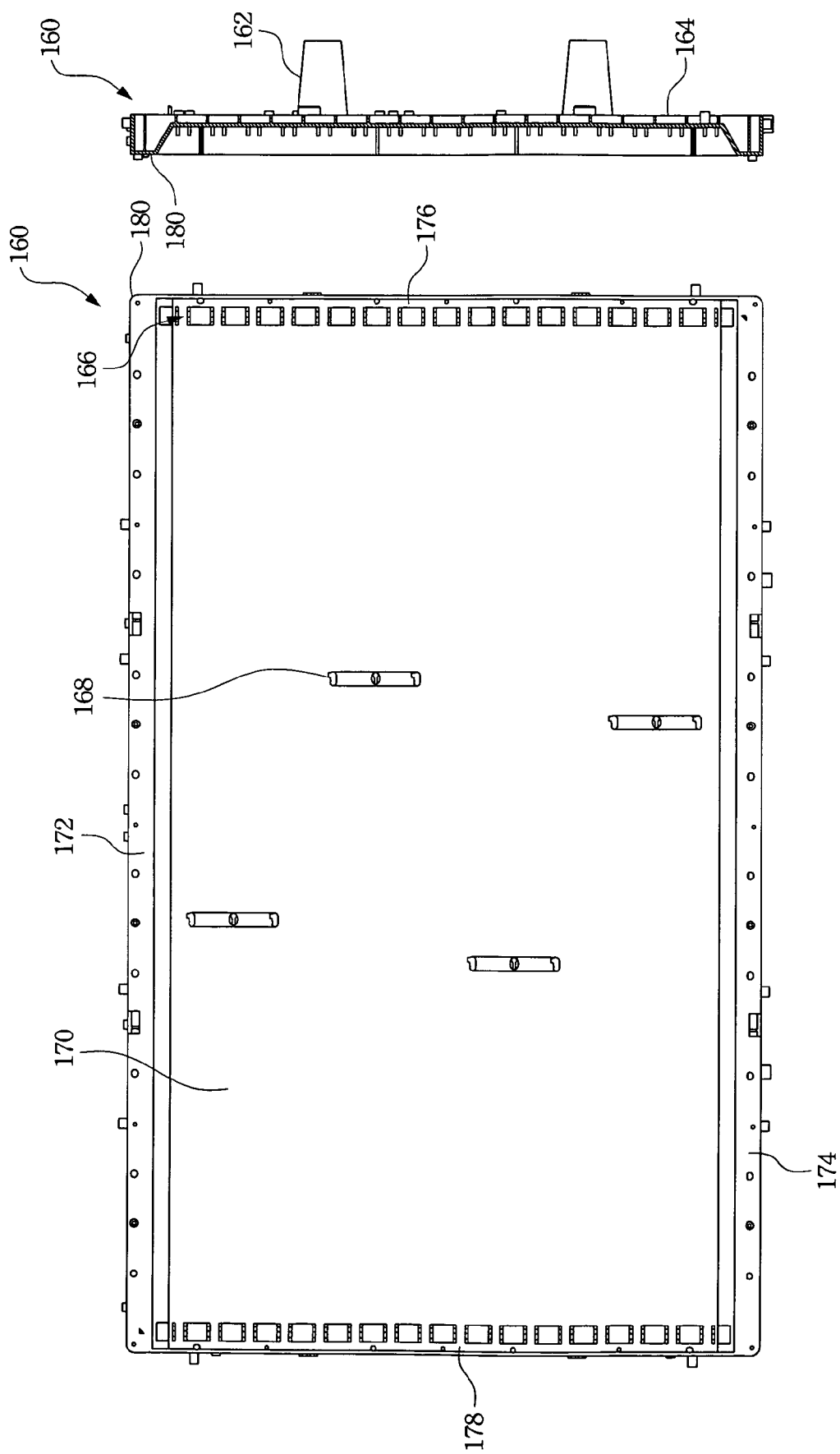
FIG. 4 illustrates a top view and a side view of the preferred embodiment of FIG. 3.

Referring to FIGS. 3 and 4, FIG. 3 illustrates a preferred embodiment of a real bezel of a backlight module of a flat panel display according to the present invention, and FIG. 4 is a top view and a side view thereof. The first bezel 160 includes a bezel main body 180 surrounded by a sidewall 172, a sidewall 174, a sidewall 176, and a sidewall 178.

The bezel main body 180 further includes a first surface and a second surface. The first surface of the bezel main body 180, i.e. a backside of the first bezel 160, has a plurality of ribs 164 in conjunction with the sidewalls 172, 174, 176, 178 to reinforce the strength of the bezel main body 180. Accordingly, the first bezel 160 can support the components of the flat panel display 100. In addition, while combined with a plurality of supporting studs 162 on the first surface of the bezel main body 180, the flat panel display 100 can effectively be fixed with a foot stand and/or a wall mounting bracket.

A second surface of the bezel main body 180, i.e. the inner side of the first bezel 160, is preferably formed with a reflective film 170 thereon to reflect the light generated by the cold cathode fluorescent lamps 152 to the display panel 120.

The ribs 164 formed on the backside of the first bezel 160 construct a plurality of reinforced lattices, for example, square lattices and/or polygonal lattices such as honeycomb lattices, to reinforce the strength of the bezel main body 180. The supporting studs 162 can be round supporting studs and/or polygonal supporting studs to couple to the foot stand and/or the wall mounting bracket for the flat panel display 100 so that the flat panel display 100 can be hung on the wall or stand alone. Since the supporting studs 162 protrude from the bezel main body 180 at a predetermined height, the circuit board, for example, a printed circuit board, of the flat panel display 100 can be fixed on the first surface of the first bezel 160. The printed circuit board can be protected from interference by electromagnetic wave emissions by being covered with a metal film or a metal box.

The first bezel 160 of the backlight module for the flat panel display can be made of a plastic material or any other material that can be integrally formed the first bezel 160. Accordingly, the weight of the first bezel can be effectively reduced. Since the supporting studs 162 protruding from the first bezel 160 can be directly fixed to the foot stand and the wall mounting bracket, and it is not necessary to use an additional bracket to couple the flat panel display to the foot stand and the wall mounting bracket so the manufacturing cost and processes can be reduced.

The reflective film 170 can also be directly formed on the second surface of the first bezel 160, that is, integrated on the bezel main body 180, to reflect the light of the cold cathode fluorescent lamps 152. Since the reflective film 170 can be integrated on the first bezel 160 with plastic injection molding, the separable components of the flat panel display 100 and the assembling processes for the flat panel display 100 are both reduced. The reflective film 170 is preferably made of a material with a high reflection coefficient to improve the reflection effect of the light. Accordingly, the whole first bezel 160 can be made of a material with a high reflection coefficient. Otherwise, the first bezel 160 can be made of two kinds of plastic materials with two shot injection molding technology. In addition, the reflective film 170 can also be formed on the second surface of the first bezel by painting a high reflection coating thereon.

The first bezel 160 further includes a plurality of lamp fixing indentations 166 to dispose the cold cathode fluorescent lamps 152 therein. Referring to FIG. 4, the lamp supports 168 can be integrated on the first bezel 160 to further reduce the assembling components of the flat panel display 100, simplify the assembling process of the flat panel display 100 and cost down the manufacturing cost. In addition, the positioning protrusions 153 can also be integrated on the first bezel 160 to couple to the positioning indentation 142 and the positioning holes 144 on the optical films 140 for positioning the optical films 140.

The backlight module of the flat panel display according to the present invention uses a material such as plastic to integrate the rear bezel thereof so that the weight can be effectively reduced. In conjunction with the ribs and sidewalls, the rear bezel can support the components of the flat panel display. Furthermore, supporting studs directly formed on the rear bezel can be conveniently fixed to the wall mounting bracket and the foot stand. In addition, the integrated reflective film and lamp supports can further reduce the assembling process of the flat panel display.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A backlight module, comprising:
   a first bezel comprising
   a bezel main body having a first surface and a second surface,
   a plurality of ribs interlaced on the first surface,
   a plurality of studs formed on the first surface, and
   a sidewall structure formed on at least one side of the bezel main body;
   a plurality of lamps disposed on the second surface of the bezel main body;
   an optical film disposed above the lamps; and
   a second bezel disposed on the optical film;
   wherein the lamps and the optical film are sandwiched between the second bezel and the first bezel.

2. The backlight module of claim 1, further comprising a plurality of lamp supports formed on the second surface of the bezel main body.

3. The backlight module of claim 1, further comprising a reflective film formed on the second surface of the bezel main body.

4. The backlight module of claim 1, wherein the first bezel further comprises a least one positioning protrusion formed on the sidewall of the first bezel, the optical film further comprises at least one positioning opening to couple to the positioning protrusion.

5. A flat panel display, comprising:
   a first bezel further comprising
   a bezel main body having a first surface and a second surface,
   a plurality of ribs interlaced on the first surface,
   a plurality of studs formed on the first surface, and
   a sidewall structure formed on at least one side of the bezel main body;
   a plurality of lamps disposed on the second surface of the bezel main body;
   an optical film disposed above the lamps;
   a second bezel disposed on the optical film, wherein the lamps and the optical film are sandwiched between the second bezel and the first bezel;
   a display panel configured on the middle bezel; and
   a third bezel configured on the display panel.

6. The flat panel display of claim 5, further comprising a plurality of lamp supports formed on the second surface of the bezel main body.

7. The flat panel display of claim 5, further comprising a reflective film formed on the second surface of the bezel main body.

8. The flat panel display of claim 5, wherein the first bezel further comprises at least one positioning protrusion formed on the sidewall of the first bezel, the optical film further comprises at least one positioning opening to couple to the positioning protrusion.

9. The flat panel display of claim 5, further comprising a printed circuit board disposed on the first surface of the bezel main body and covered by a metal.

* * * * *